Sept. 11, 1962     J. POOLE ETAL     3,053,989

MEANS FOR STARTING AUTOMOBILES

Filed Jan. 4, 1960     2 Sheets-Sheet 1

*INVENTORS*
JACK POOLE
VIVA J. POOLE
BY
Lockwood, Woodard, Smith & Weikart
ATTORNEYS

# United States Patent Office 3,053,989
Patented Sept. 11, 1962

3,053,989
MEANS FOR STARTING AUTOMOBILES
Jack Poole and Viva J. Poole, both of 3202 Dunbar Drive, Marion, Ind.
Filed Jan. 4, 1960, Ser. No. 307
8 Claims. (Cl. 290—37)

The present invention relates to a starter system and finds it primary utility as a starter system for the internal combustion engine of an automobile.

It is a well known fact that an automobile operates better in cold weather after its engine has run for sufficient time to reach normal operating temperature. Because of the fact that the majority of automobile heaters operate from the heat of water used to cool the automobile engine, such heaters do not operate properly until the automobile engine has reached normal operating temperature. An automobile engine may be warmed up by the driver actually getting in the car and starting the motor; however, this procedure wastes the time of the driver and subjects him to the cold temperatures which he may want to avoid.

It is, therefore, a primary object of the present invention to provide an improved starter system for starting an unattended engine.

A further object of the present invention is to provide an improved starter system for starting the engine of an automobile.

Another object of the present invention is to provide a starter system for an automobile which may be operated remotely of the automobile.

Still a further object of the present invention is to provide a starter system for an automobile which may be preset to start the automobile at a predetermined time.

Still another object of the present invention is to provide a starter system for an automobile which is simple, inexpensive and easy to assemble, does not waste gasoline and is dependable in operation.

Further objects and advantages will become apparent as the description proceeds.

The full nature of the invention will be understood from the accompanying drawings and the following description and claims:

Figure 1:
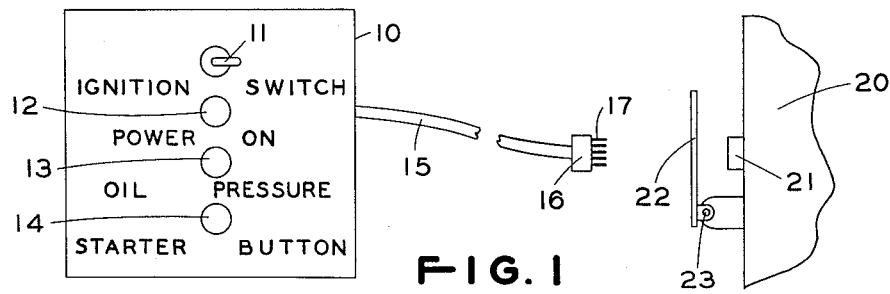
FIG. 1 is a side elevation of the rear of an automobile and of a device for starting the automobile forming a part of the starter system of the present invention.

Referring now to the drawings, there is illustrated in FIG. 1 a box or container 10 having mounted therein an ignition switch 11, a power-on light 12, an oil pressure light 13 and a push button 14 for energizing the solenoid of the starter motor of an automobile. Extending from the box 10 is an elongated electrical cord 15 terminating in an electrical plug 16 having five prongs 17, each of which is associated with one of five electrically conducting wires contained within the cord 15. Each of the wires within the cord 15 is associated with the various switches and lights 11–14 in a manner to be described below.

The cord 15 is a sufficient length that the box may be located, for example, inside the house while the cord 15 extends from the house into the garage (or driveway, etc.). An automobile 20 located within the garage is provided with a jack 21 proportioned and arranged for reception of the electrical plug 16. The electrical circuitry associated with the jack 21 extends to the starter motor, the ignition coil and to various other components of the automobile and will be described in detail below. The jack 21 is positioned behind the license plate 22 of the automobile which is pivotally mounted at 23 upon the rear of the automobile. If desired, a suitable spring (not shown) may be provided within the pivotal mounting of the license plate for retaining the license plate in a vertically upwardly extending position. It can be seen that the jack 21 is positioned in such a manner that it will not be noticed or tampered with by vandals.

Figure 2:
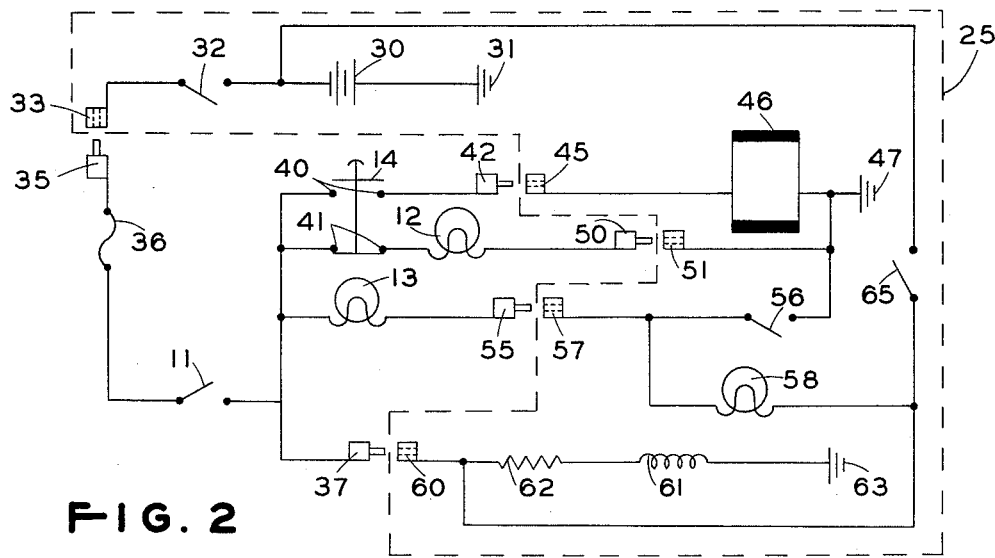
FIG. 2 is an electrical schematic drawing of the device of FIG. 1 and of associated electrical circuitry in the automobile.

Referring now to FIG. 2, the various components surrounded by the dotted line 25 are located within the automobile and the jack 21 while the remaining parts are associated with the box 10, the electrical cord 15 and electrical plug 16. The battery 30 of the automobile is grounded at 31 and is arranged in series with a limit switch 32 which is associated with the gear shift or automatic transmission in such a manner that the switch is open whenever the gear shift is out of neutral position or whenever the automatic transmission is in position for moving the automobile. Such switches are conventionally used in present-day automobiles having automatic transmissions for automatically cutting out the starter motor of the automobile when the automatic transmission is in position for moving the automobile. If desired, the switch 32 may be the switch already incorporated in the automobile or may be added to the automobile for the purposes of the present invention.

The switch 32 is arranged in series with the device 33 which represents one of the sockets of the jack 21. The device 35 represents one of the prongs of the electrical plug 16 and is located for insertion in the socket 33. The prong 35 is arranged in series with a fuse 36 and the ignition switch 11. The switch 11 is arranged in series with the push button 14, with the oil pressure light 13 and with the device 37 which represents still a further one of the prongs 17.

The push button 14 has two sets of contacts 40 and 41. When the push button is not depressed, the contacts 41 are closed and the contacts 40 are open. When the push button is depressed, the contacts 40 are closed and the contacts 41 are open. Arranged in series with the contacts 40 is a device 42 representing a further one of the prongs 17. The device 42 is located for reception within the device 45 which represents a further one of the sockets of the jack 21 and is arranged in series with the solenoid 46 of the starter motor of the automobile, the solenoid 46 being grounded at 47.

The contacts 41 of the push button 14 are arranged in series with the power-on light 12 which, in turn, is arranged in series with a device 50 representing a further one of the prongs 17. The device 50 is located for reception within the device 51 representing a further one of the sockets of the jack 21 whereby the device 50 may be grounded with relation to the automobile.

The device 55, which represents the remaining prong 17, is arranged in series with the oil pressure light 13 and is located for connection in series with a switch 56 by inserting the device 55 in the device 57 which represents a further socket of the jack 21. The switch 56 represents the conventional oil pressure switch of the automobile and is normally closed when the ignition key is turned on, the engine is not running and the oil pressure of the engine is zero. The oil pressure switch 56 is arranged in series with the conventional oil pressure light 58 located on the dash of the automobile. When the oil pressure of the engine rises to a predetermined point because of the operation of the engine, the oil pressure light 58 will be extinguished by the opening of the switch 56. Since the switch 56 is conventional and well known in the art, its actuating means will not be described.

The prong 37 is located for insertion within the device 60 which represents another of the sockets of the jack 21 whereby the ignition coil 61 may be energized. The ignition coil 61 is arranged in series with a resistor 62 and is grounded at 63, the purpose of the resistance 62 being to provide the proper voltage drop across the coil 61. Alternatively, the ignition coil 61 may be energized by closing of the conventional key-operated ignition switch 65 which is arranged in series with the battery 30 in the conventional manner.

Figure 3:
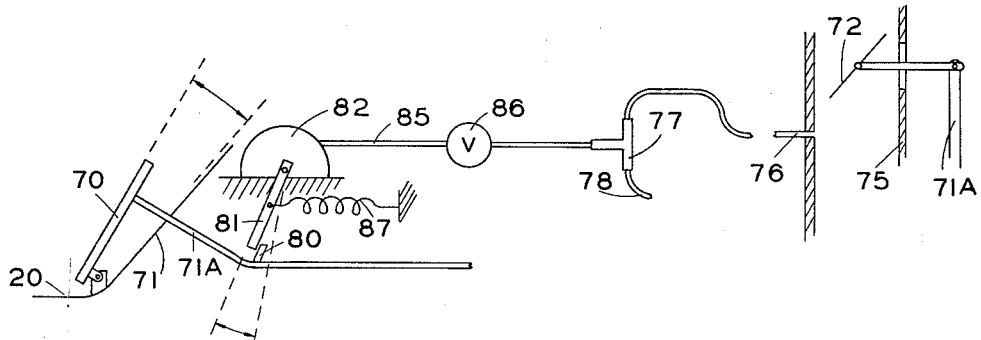
FIG. 3 is a schematic view of structure associated with the throttle and intake manifold of the automobile of FIG. 1 and forming a part of the starting system of the present invention.

Referring to FIG. 3, the automobile 20 is provided with a conventional foot-operated throttle pedal 70 which is pivotally mounted on the floor board 71 of the automobile. The throttle pedal has secured thereto a throttle linkage 71A which connects the foot pedal in conventional manner with the butterfly valve 72 pivotally mounted within the intake manifold 75 of the automobile. The automobile is provided with a conventional conduit 76 which opens into the intake manifold below the butterfly valve and communicates the vacuum within the intake manifold to the windshield wipers in conventional manner, the T-connection 77 connecting the conduit 76 to a further conduit 78 which leads to the windshield wipers.

A dog 80 is removably fixed to the throttle linkage 71A in such a manner as to be actuated by an arm 81 which is pivotally mounted upon an air motor 82 which is fixedly mounted upon the frame of the automobile. The air motor 82 is actuated by vacuum communicated thereto through a conduit 85 which connects the air motor with the T-connection 77. The vacuum communication to the air motor 82 is controlled by a conventional valve 86 which may be set to any desired position so that the vacuum produced in the intake manifold is quickly communicated to the air motor or takes a predetermined amount of time to be communicated to the air motor.

A tension spring 87 is fixed at one end to the frame of the automobile and at the other end to the arm 81. When no vacuum is being communicated to the air motor, the spring 87 holds the arm 81 in such a position that the dog 80 is acted upon to hold the foot pedal 70 in a half-open throttle position. When the automobile engine is operating, vacuum is produced within the intake manifold causing the air motor 82 to be actuated by means of the vacuum to move the arm 81 away from the dog 80 and into the solid line position of FIG. 3 so as to allow normal operation of the foot throttle 70. The valve 86 may be adjusted so that the movement of the arm 81 from the position wherein it is holding the throttle half open to its solid line position take any predetermined amount of time. Thus, when the automobile is being started on a very cold day, it may be advisable to adjust the valve 86 so that it takes perhaps a minute for the throttle to return to idle position.

Assume now that the automobile 20 is parked within the garage and that a person within the house desires to start the automobile. The electrical plug 16 is inserted within the jack 21. This may be done at any time previous to the starting of the automobile. The switch 11 is turned on causing the light 12 to be energized and to notify the person that the device is operating. Assume also that the switch 32 is closed inasmuch as the gear shift of the automobile is in neutral.

The light 13 will also be on because the oil pressure switch 56 will be closed. As was described above, the oil pressure switch 56 is closed at all times when the automobile engine is not running and the oil pressure is at zero. The closing of the switch 11 will also cause the ignition coil 61 to be energized. It should be noted that the key-operated switch 65 will be open inasmuch as the key is not in the ignition.

The device is now in readiness for starting the engine. The operator presses the push button 14 causing the contacts 40 to be closed and the contacts 41 to be opened. The opening of the contacts 41 deenergizes the light 12. The closing of the contacts 40 energizes the solenoid 46 of the starter motor causing the engine to be turned over. Because of the fact that the throttle is held in half-open position by the spring 87, the automobile will quickly start.

The operator is notified of the starting of the automobile by the deenergization of the light 13. This deenergization occurs when the oil pressure switch 56 is opened by the increase of the oil pressure produced by the operation of the engine. When the light 13 is extinguished, the operator is notified to relieve the pressure upon the push button 14 allowing the starter motor solenoid 46 to deenergize. Depending upon the setting of the valve 86, the throttle pedal 70 will move at a predetermined rate to idle position. To insure dependable starting on cold winter days, the valve 86 may be set in such a manner that this rate is relatively slow.

The engine is then allowed to run for a sufficient amount of time to reach proper operating temperature. The operator is always aware of whether or not the engine is running by means of the light 13. Should the engine stop before it has reached proper operating temperature, the light 13 will be energized and the operator is notified to repeat the operation of the device. After the proper operating temperature has been reached, the operator throws the switch 11 to "off" position causing the voltage drop across the ignition coil 61 to be cut off whereby the engine is stopped.

Figure 4:
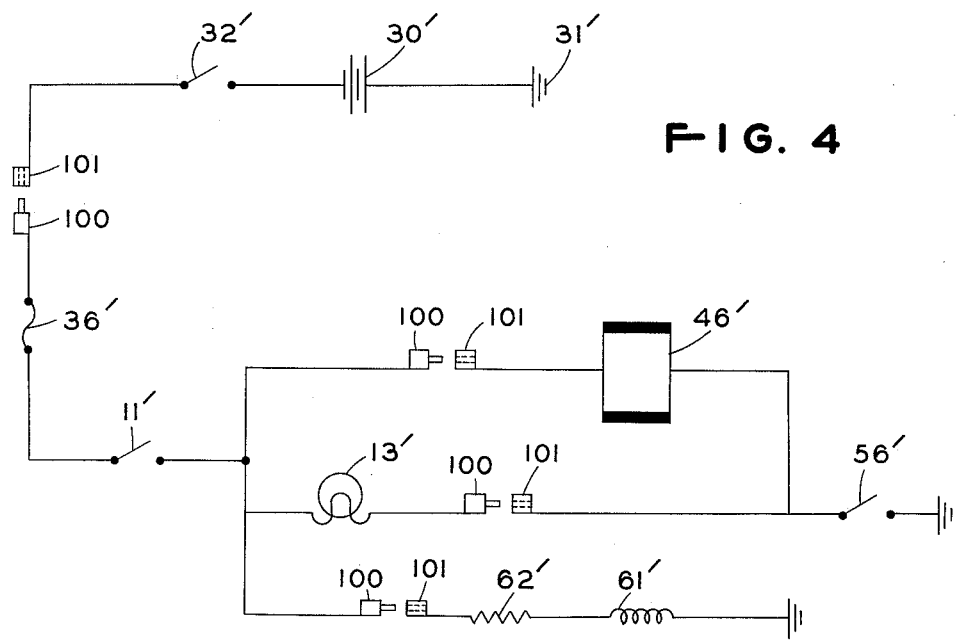
FIG. 4 is an electrical schematic drawing of an alternative embodiment of the invention.

It should be noted that various modifications within the scope of the invention may be made in the circuitry illustrated in FIG. 2. For example, the starter button 14 and the power-on light 12 and the circuitry associated therewith might be eliminated from the device. Referring to FIG. 4, such modified circuitry is illustrated. The modification of FIG. 4 is constructed and operates in exactly the same manner as described above with the following exceptions.

The battery 30' of the automobile is grounded at 31' and is arranged in series with a switch 32' arranged to break the circuit when the gear shift is out of neutral or the automatic transmission is in position for moving the car. The electrical plug is provided with a plurality of prongs 100 which function similarly to the prongs 17 and are received within sockets 101. An oil pressure light 13' is arranged in series with the oil pressure switch 56'. Unlike the above described embodiment, the solenoid 46' of the starter motor is also arranged in series with the oil pressure switch 56'.

A switch 11' located in the box or container of the device functions not only to turn on the power to the ignition coil 61' but also functions to directly energize the starter solenoid 46'. The alternative embodiment of FIG. 4 is also provided with a resistor 62' and a fuse 36' which function identically to the resistor 62 and fuse 36.

In order to operate the alternative embodiment, the switch 11' is closed causing the ignition coil 61' to be energized and also causing the starter solenoid 46' to be energized. The operator is notified that the device is operating by the energization of the light 13'. When the motor starts, the oil pressure switch 56' is opened causing the light 13' to be deenergized, whereby the operator is notified that the engine is running.

The starter solenoid 46' is cut out of the circuit by the opening of the switch 56'. After the engine has run for a sufficient amount of time to allow the engine to reach operating temperature, the switch 11' is opened breaking the circuit to the ignition coil and shutting off the engine.

Figure 5:
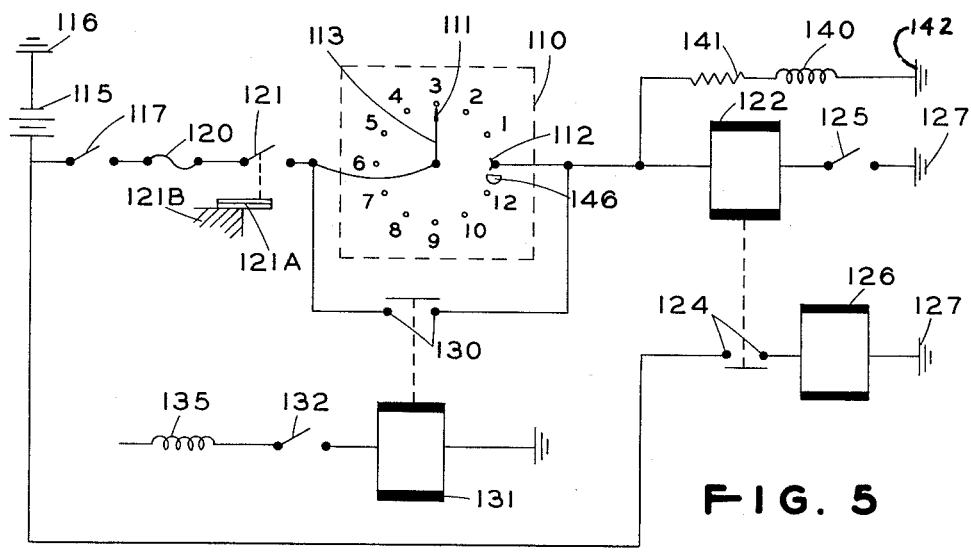
FIG. 5 is an electrical schematic drawing of a further alternative embodiment of the invention.

Referring now to FIG. 5, a further alternative embodiment of the invention is illustrated. This embodiment is identical to the above embodiments with the exception that the circuitry of FIGS. 2 and 4 is replaced by the circuitry of FIG. 5. The embodiment of FIG. 5 is so designed that the box or container 10, the electrical cord 15 and the plug 16 and the jack 21 are eliminated, the complete electrical portion of this alternative embodiment being mounted upon the automobile itself.

The embodiment of FIG. 5 is provided with a spring-loaded timer clock 110 which may be set for starting the automobile at any later time of between zero to twelve hours. The clock is provided with a pair of electrical contacts 111 and 112, one of which is fixed to the clock face and the other of which is located on the end of the hand 113 of the clock. The contact 112 is of a suitable size that as the hand 113 passes the contact 112, contact will be made between contacts 111 and 112 for a period of time approximating one minute. It should be noted that the clock 110 may be mounted in any suitable position within the automobile such as, for example, on the dash board.

The automobile is provided with a conventional battery 115 which is grounded at 116 and is arranged in series with a limit switch 117 suitably mounted upon the gear shift or automatic transmission of the automobile in such a manner as to be open when the gear shift or automatic transmission is in position for moving the automobile.

Arranged in series with the switch 117 is a fuse 120 and a heat-operated switch 121. The switch 121 is a conventional heat-operated switch which opens when the temperature of the switch has gone over a predetermined temperature and may, for example, have a bimetallic thermostat 121A associated therewith. The switch 121 is mounted externally of the water jacket 121B of the engine in such a manner as to sense the temperature of the engine. The switch 121 is arranged in series with the contacts 111 and 112 and with a relay 122 which is arranged in series with an oil pressure switch 125 similar to the above described oil pressure switches 56 and 56'.

The relay 122 has incorporated therein, a set of contacts 124 which are open when the relay is deenergized and are closed when the relay is energized. The starter solenoid 126 of the automobile is grounded at 127 and is arranged in series with the contacts 124 and with the battery 115. Thus, when the relay 122 is energized, the starter solenoid will also be energized.

There is provided in parallel with the contacts 111 and 112 a further set of contacts 130 which are associated with a relay 131, are open when the relay is deenergized and are closed when the relay is energized. The solenoid 131 is arranged in series with a manually operated switch 132 which is mounted beneath the dash of the automobile. The switch 132 and relay 131 are arranged in series with the armature winding 135 of the automobile generator which in turn is connected in conventional manner in the automobile. Thus, when the automobile engine is operating and is turning the generator at a sufficient rate, the solenoid 131 will be energized to close the contacts 130.

As has been described above, the contacts 130 are arranged in parallel with the contacts 111 and 112. Thus, the solenoid 122 may be energized either by the closure of the contacts 130 or by the closure of the contacts 111 and 112. The ignition coil 140 of the automobile is arranged in parallel with the solenoid 122 and the oil pressure switch 125, the coil 140 having a resistor 141 in series therewith and functioning identically to resistors 62 and 62'. The ignition coil 140 is grounded to the automobile at 142.

In order to start the automobile at a predetermined future time, the hand 113 of the clock 110 is set at the desired time setting. The switch 117 is placed in closed position by positioning the gear shift of the automobile in neutral and the switch 132 under the dash is closed. Assuming, for example, that it is desired to start the engine on a cold morning at a certain time, the clock might be set and these two switches closed the night before.

As the engine of the automobile cools down from previous operation, the switch 121 will close. Thus, when the hand 113 of the clock reaches the contact 112, a circuit will be made between the battery 115 and the relay 122 through the switches 117 and 121, contacts 111 and 112 and through the oil pressure switch 125 which will be closed because of the fact that the motor is not operating. Thus, the relay 122 will be energized as will the coil 140 through the switches 117 and 121 and contacts 111 and 112. As has been mentioned above, the contacts 111 and 112 wil be closed for a period of time approximating one minute. If the automobile does not start during this period of time, the hand 113 will move away from the contact 112 and will engage the stop member 146 fixed to the face of the clock, thus preventing the battery 115 from becoming overly discharged.

Assuming, however, that the motor starts within this one minute period, the throttle and associated structure described in connection with FIG. 3 will operate as above described. The oil pressure switch 125 will open to deenergize the starter solenoid 122. As the engine runs, the generator will cause the solenoid 131 to be energized and to close the contacts 130. Thus, the ignition coil 140 will be locked in to the circuit and the engine will continue to run even though the one minute period is over and no current is being supplied to the ignition coil through the contacts 111 and 112. When the engine reaches the desired operating temperature, the switch 121 will open shutting off the engine.

It should be noted that the various switches 32, 32' and 117 in the embodiments of FIG. 2, FIG. 4 and FIG. 5 will prevent the automobile from being stolen. Thus, if a person should get into the automobile while the engine is being warmed up and should place the gear shift or automatic transmission in position to move the automobile, the various switches 32, 32' and 117 will be opened shutting off the engine of the automobile.

Various other alternative embodiments of the invention can be conceived. For example, the contacts 111 and 112 of FIG. 5 might be closed by a radio-operated remote control device instead of the timer clock 110. Also, the structure illustrated in FIG. 3 and described in connection therewith, might be replaced by the hand throttle conventional in older automobiles. Of course, such hand throttle operation would not provide the advantages of the structure of FIG. 3. As a further alternative, the warming light of the present invention (the lights 13 and 13') might be operated by relay controlled contacts, said relay being controlled by the generator of the automobile.

From the above description, it will be obvious that the present invention provides an improved starter system for starting an unattended automobile engine, the starter system being relatively inexpensive and easy to assemble. It will also be obvious that the present invention provides a starter system for an automobile which may be preset to start the automobile at a predetermnied time. It can also be seen that the starter system of the present invention does not waste gasoline inasmuch as the air motor 82 returns the throttle to idle position as rapidly as is practical.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention and the scope of the claims are also desired to be protected.

The invention claimed is:

1. A starter system for an engine having a fuel intake manifold with a throttle, a starter motor and an ignition coil, the system comprising a spring arranged to yieldably hold said throttle in partially open position, a vacuum operated motor arranged, when energized, to remove the action of said spring from said throttle, a conduit connecting said vacuum operated motor and said intake manifold for energizing said vacuum operated motor when vacuum is produced in said intake manifold, means for energizing said coil, and means for energizing said starter motor.

2. A starter system for an engine having a fuel intake manifold with a throttle, a starter motor and an ignition coil, the system comprising a spring arranged to yieldably hold said throttle in partially open position, a vacuum operated motor arranged, when energized, to remove the action of said spring from said throttle, a conduit connecting said vacuum operated motor and said intake manifold for energizing said vacuum operated motor when vacuum is produced in said intake manifold, an adjustable valve arranged to control flow through said conduit, means for energizing said coil, and means for energizing said starter motor.

3. A starter system for the engine of an automobile having a fuel intake manifold with a throttle, a starter motor, an ignition coil, a battery and an oil pressure indicator, said system comprising an electrically operated indicator and a pair of switches located together and remotely of the automobile, said electrically operated indicator being operatively connectable to the oil pressure indicator of the automobile, one of said switches arranged to close a circuit between the battery and the starter motor, the other of said switches arranged to close a circuit between the ignition coil and the battery, a spring arranged to yieldably hold said throttle in partially open position, a vacuum operated motor arranged, when energized, to remove the action of said spring from said throttle, a conduit connecting said vacuum operated motor and said intake manifold for energizing said vacuum operated motor when vacuum is produced in said intake manifold, and an adjustable valve arranged to control flow through said conduit.

4. A starter system for the engine of an automobile having a fuel intake manifold with a throttle, a generator, a starter motor, an ignition coil, a battery and an oil pressure light and associated switch, said system comprising a heat actuated switch mounted on said engine, said switch arranged to be open when the engine reaches a predetermined temperature, a first pair of contacts, a second pair of contacts in parallel with said first pair of contacts, said second pair of contacts arranged to be closed by the operation of said generator, a relay in series with said oil pressure switch and arranged to control said starter motor, said ignition coil being in parallel with said relay and oil pressure switch, the combination of said relay, oil pressure switch and ignition coil being in series with said contacts, heat actuated switch and battery.

5. The system of claim 4 additionally comprising a timer arranged to close said first pair of contacts at a predetermined time for a predetermined period of time.

6. The system of claim 4 additionally comprising a timer arranged to close said first pair of contacts at a predetermined time for a predetermined period of time, a spring arranged to yieldably hold said throttle in partially open position, a vacuum operated motor arranged, when energized, to remove the action of said spring on said throttle, a conduit connecting said vacuum operated motor and said intake manifold for energizing said vacuum operated motor when vacuum is produced in said intake manifold.

7. A starter system for the engine of an automobile having a fuel intake manifold with a throttle, a generator, a starter motor, an ignition coil, a battery and an oil pressure light and associated switch, said system comprising a heat actuated switch mounted on said engine, said switch arranged to be opened when the engine reaches a predetermined temperature, a first pair of contacts, a second pair of contacts in parallel with said first pair of contacts, said second pair of contacts arranged to be closed by the operation of said generator, a relay in series with said oil pressure switch and arranged to control said starter motor, said ignition coil being in parallel with said relay and oil pressure switch, the combination of said relay, oil pressure switch and ignition coil being in series with said contacts, heat actuated switch and battery, a spring arranged to yieldably hold said throttle in partially open position, a vacuum operated motor arranged, when energized, to remove the action of said spring from said throttle, a conduit connecting said vacuum operated motor and said intake manifold for energizing said vacuum operated motor when vacuum is produced in said intake manifold.

8. A starter system for the engine of an automobile having a fuel intake manifold with a throttle, a starter motor and an ignition coil, the system comprising a vacuum operated motor fixedly mounted on said automobile and including a movable arm, a spring anchored at one end to said arm and at the other end to said automobile and urging said arm against said throttle to hold said throttle in partially open position, said vacuum operated motor arranged, when energized, to move said arm away from said throttle, a conduit connecting said vacuum operated motor and said intake manifold for energizing said vacuum operated motor when vacuum is produced in said intake manifold, means for energizing said coil, and means for energizing said starter motor.

References Cited in the file of this patent
UNITED STATES PATENTS

| | | |
|---|---|---|
| 1,962,252 | McGrath | June 12, 1934 |
| 2,544,955 | Harrelson | Mar. 13, 1951 |
| 2,757,295 | Briggs | July 31, 1956 |
| 2,934,055 | Kennedy | Apr. 26, 1960 |